(12) United States Patent
Massonnat et al.

(10) Patent No.: US 12,140,722 B2
(45) Date of Patent: Nov. 12, 2024

(54) METHOD FOR DETERMINING TRAVERTINE DEPOSIT

(71) Applicant: TOTAL SE, Courbevoie (FR)

(72) Inventors: Gérard Massonnat, Pau Cedex (FR); Aurélien Virgone, Pau Cedex (FR)

(73) Assignee: TOTALENERGIES ONETECH, Courbevoie (FR)

( * ) Notice: Subject to any disclaimer, the term of this patent is extended or adjusted under 35 U.S.C. 154(b) by 666 days.

(21) Appl. No.: 17/290,590

(22) PCT Filed: Oct. 30, 2018

(86) PCT No.: PCT/IB2018/001396
§ 371 (c)(1),
(2) Date: Apr. 30, 2021

(87) PCT Pub. No.: WO2020/089665
PCT Pub. Date: May 7, 2020

(65) Prior Publication Data
US 2021/0356624 A1    Nov. 18, 2021

(51) Int. Cl.
*G01V 20/00*    (2024.01)
*G06T 17/05*    (2011.01)
*G06T 17/20*    (2006.01)

(52) U.S. Cl.
CPC ............. *G01V 20/00* (2024.01); *G06T 17/05* (2013.01); *G06T 17/20* (2013.01); *G01V 2210/1293* (2013.01); *G01V 2210/661* (2013.01)

(58) Field of Classification Search
CPC ......... G01V 99/005; G01V 2210/1293; G01V 2210/661; G06T 17/05; G06T 17/20
See application file for complete search history.

(56) References Cited

U.S. PATENT DOCUMENTS 8,560,286 B2 * 10/2013 Favier ................... G06F 30/20
345/420

OTHER PUBLICATIONS

PCT International Search Report for PCT/IB2018/001396 mailed Jul. 7, 2019, 3 pages.
John J. Veysey: "Complex fluid dynamics: From laminar to geophysical flows", Dissertation Submitted in partial fulfillment of the requirements for the degree of Doctor of Philosophy in Physics in the Graduate College of the University of Illinois at Urbana-Champaign, Dec. 1, 2006 (Dec. 1, 2006), pp. 1-275, XP055601834, ISBN: 978-0-542-99075-5 Retrieved from the Internet: URL:http://citeseerx.ist.psu.edu/viewdoc/download?doi=10.1.1.662.9210&rep=rep1&type=pdf [retrieved on Jul. 3, 2019].

(Continued)

*Primary Examiner* — Manuel A Rivera Vargas
(74) *Attorney, Agent, or Firm* — Husch Blackwell LLC

(57) ABSTRACT

A method for determining a travertine deposit by:
receiving a geological gridded model comprising a plurality of cells;
receiving a source cell or a group of source cells of the geological gridded model corresponding to a source;
determining a trajectory of a particle introduced at the source based on stochastic movements; and
updating a travertine deposit in cells located on the trajectory of the particle.

11 Claims, 6 Drawing Sheets

(56) References Cited

OTHER PUBLICATIONS

Nigel Goldenfeld et al: "Dynamics of precipitation pattern formation at geothermal hot springs", arxiv.org, Cornell University Library, 201 Olin Library Cornell University Ithaca, NY 14853, Jan. 13, 2006 (Jan. 13, 2006), XP080224171, DOI: 10.1103/PHYSREVLETT. 96.254501.
Dupraz C et al: "Translation of energy into morphology: Simulation of stromatolite morphospace using a stochastic model" Sedimentary Geology, Elsevier, Amsterdam, NL, vol. 185, No. 3-4, Mar. 15, 2006 (Mar. 15, 2006), pp. 185-203, XP025126078, ISSN: 0037-0738, DOI: 10.1016/J.SEDGE0.2005.12.012 [retrieved on Mar. 15, 2006].
A. Brad Murray et al: "A cellular model of braided rivers", Nature, vol. 371, Sep. 1, 1994 (Sep. 1, 1994), pp. 54-57, XP055601405, DOI: doi.org/10.1038/371054a0.

* cited by examiner

METHOD FOR DETERMINING TRAVERTINE DEPOSIT

The present application is a National Phase entry of PCT Application No. PCT/FR2018/001396, filed Oct. 30, 2018, which application is hereby incorporated by reference herein in its entirety.

FIELD OF THE INVENTION

The present disclosure pertains to the field of determining geological structures for hydrocarbon exploration and exploitation. In particular, the disclosure relates to a method for determining a geological profile of a region based on a modeling of limestone formation.

BACKGROUND OF THE INVENTION

The sedimentary basins explored by the hydrocarbon industry are becoming more complex. An adequate knowledge of the geological structures of these basins is essential, for instance:
- to predict the presence or not of hydrocarbons, its nature and the volumes of the reserves;
- to obtain information on the shape of the deposit in order to determine the best locations for future production wells (for instance, to drill future wells);
- to ensure safety when setting up and carrying out a drilling, etc.

It is meant by "hydrocarbons" conventional hydrocarbons, such as petroleum, natural gas and coal, as well as unconventional hydrocarbons, such as coal gas, shale gas, shale oil, oil shale or tar sands.

It is therefore important to know the geological structures of a region, including the different layers of sedimentary rocks, such as travertine, that make up the soil.

Travertine is a continental limestone sedimentary rock, formed by precipitation of carbonates in ground and surface waters, and/or hot sources, according to the following equation:

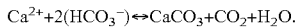

$$Ca^{2+}+2(HCO_3^-) \leftrightarrow CaCO_3+CO_2+H_2O.$$

As mentioned before, knowing the sedimentary rocks facies, and in particular the travertine facies, of the region is valuable for soil exploration and exploitation.

Furthermore, travertine is a building material often used for paving patios and garden paths, as well as for facades and wall cladding. Therefore, knowing the travertine facies of the region is also an important problem for travertine extraction.

However, it is generally very difficult to know with certainty the geological composition of a soil.

For instance, it may be useful to perform drilling at different points of interest. In this manner, it is possible to determine the different facies vertically from the drill cores, according to the depth. However, the drilling sites may turn out to be expensive and they only allow obtaining information at a limited number of points, as the drilled holes may be spaced more than a hundred meters apart.

In the context of pedogenesis, it is possible modeling the different layers of sedimentary rocks according to a plurality of parameters, such as climate, vegetation, topography, and/or parent material. However, none of the existing techniques provides effective model of the travertine facies.

There is thus a need for an efficient method for determining a travertine facies in a given area.

SUMMARY OF THE INVENTION

The disclosure relates to a computer implemented method for determining travertine deposit on an area. This method comprises:
- /a/ receiving a geological gridded model of the area, the geological gridded model comprising a plurality of cells;
- /b/ receiving a source cell or a group of source cells of the geological gridded model, said source cell or group of source cells corresponding to a source located in the area;
- /c/ determining, in the geological gridded model, a trajectory of a particle introduced at the source cell or at the group of source cells, said trajectory being defined by stochastic movements of the particle;
- /d/ updating a travertine deposit in cells of the geological gridded model located on the trajectory of the particle.

By "source" it is meant any source at the exit of which deposits of travertine can be formed, for instance a karst source. The wording "source cell" has no other technical meaning than a cell corresponding to a location of a source in the geological gridded model.

By "trajectory", it is meant a path passing through different cells of the geological gridded model (also simply called "grid"), according to a set of stochastic movements of the particle on the grid.

Advantageously, this method allows estimating a quantity of travertine deposits at a source.

In one particular embodiment, the determination of the trajectory may be based on whether the source is located above a water level or not.

In particular, the probabilities associated to the stochastic movements of the particle may be different for underwater sources and for aerial sources. This allows reproducing more faithfully the natural phenomena of travertine formation.

The update of the travertine deposit in cells located on the trajectory of the particle may also be performed according to parameters depending on the position of the source with respect to the water level. Indeed, the travertine formation process in nature is not the same for an underwater source and for an aerial source.

Furthermore, a number of particles introduced at the source cell or at the group of source cells may be determined based on a target height of travertine deposit, and/or a maximum quantity of travertine deposit allowed per cell of the grid.

In addition, steps /b/, /c/ and /d/ may be iteratively performed until an average travertine deposit is reached for a group of cells and/or when a maximum quantity of travertine deposit allowed per cell of the grid is reached.

Defining a target height of travertine deposit, an average travertine deposit and/or a maximum quantity of travertine deposit allowed per cell allows determining more accurately the deposit in the cells of the grid, and limiting the aberrant situations.

Furthermore, if the source cell or at the group of source cells is above a water level in the model and if the trajectory meets the water level, said particle may be destroyed.

This enables better modeling of the natural phenomenon of carbonate precipitation/deposit.

In one embodiment, if the source cell or the group of source cells is above a water level in the model, updating a travertine deposit may comprise:

modifying a height of a current cell located on the trajectory according to a quantity of travertine, said quantity being function of a slope between said current cell and a neighboring cell located in a neighborhood of said current cell.

By "neighborhood" it is meant a set of cells of the grid located, relative to the current pixel, at a distance lower than a predetermined value. This distance may be any mathematical distance, for example Euclidian, Manhattan, Minkowski distance, etc. The distance may be evaluated, for instance, between the centers of respective cells.

In particular, the quantity of travertine may comprise a linear term which depends on the slope, and a non-linear term which depends on the slope.

For instance, the quantity of travertine may be equal to:

$$R_1+R_2\times S+R_3\times S^{1/2}$$

where S is the slope between the current cell and the neighboring cell, and $R_1$, $R_2$ and $R_3$ are coefficients.

According to one embodiment, each cell of the geological gridded model may have a respective altitude. In that case, if the source is located above the water level, the stochastic movements of the particle in /c/ include:
  a first stochastic displacement associated to a set of first probabilities, said first probabilities depending on a slope between a first cell where the particle is located and a second cell located in a neighborhood of said current cell; and
  a second stochastic displacement in which a second probability that the particle moves from a cell A to a cell B, cell B having a higher altitude than cell A, is set to zero or to a value below a predetermined threshold of significance.

For instance, the first stochastic displacement may correspond to an "advective" displacement, following the topography of the area, and in particular the slope. This advective displacement may be carried out according probabilities depending on the local slope.

The second stochastic displacement may correspond to a "dispersive" displacement. In that case, the particle is very unlikely to go up the slope. In other words, the particle has a high probability to move to a "downstream" neighboring cell (i.e. a cell neighboring having a lower altitude than the current cell), and a very low probability (and eventually, a probability equal to zero) to move to a, "upstream" neighboring cell (i.e. a cell neighboring having a higher altitude than the current cell).

By "threshold of significance", it is meant a threshold below which the probability that the particle moves upstream is considered as very weak (for instance, 2.5%). Of course, this wording is meant to facilitate reading and has no other technical meaning.

In addition or alternatively, if the source is located under the water level (100), the stochastic movements of the particle in /c/ are vertical movements.

A computer program implementing all or part of the method described above, installed on existing equipment, is advantageous in and of itself, if it allows such a determination of travertine deposit in an area.

The present disclosure therefore also relates to a non-transitory computer readable storage medium, having stored thereon a computer program comprising program instructions, the computer program being loadable into a data-processing unit and adapted to cause the data-processing unit to carry out the method described above when the program is run by the data-processing device.

FIG. 5, described in detail below, may constitute the flowchart for the general algorithm of such a computer program.

Furthermore, a device for determining travertine deposit on an area can be advantageous in and of itself. Therefore, another aspect of the disclosure relates to a device comprising:
  an interface for receiving a geological gridded model of the area, the geological gridded model comprising a plurality of cells;
  a circuit for receiving a source cell or a group of source cells of the geological gridded model, said source cell or group of source cells corresponding to a source located in the area;
  a circuit for determining, in the geological gridded model, a trajectory of a particle introduced at the source cell or at the group of source cells, said trajectory being defined by stochastic movements of the particle;
  a circuit for updating a travertine deposit in cells of the geological gridded model located on the trajectory of the particle.

Other features and advantages of the method and apparatus disclosed herein will become apparent from the following description of non-limiting embodiments, with reference to the appended drawings.

BRIEF DESCRIPTION OF THE DRAWINGS

The present disclosure is illustrated by way of example, and not by way of limitation, in the figures of the accompanying drawings, in which like reference numerals refer to similar elements and in which.

DESCRIPTION OF PREFERRED EMBODIMENTS

Travertine is a form of limestone deposited by mineral sources, and formed by a process of precipitation of calcium carbonate.

Figure 1:
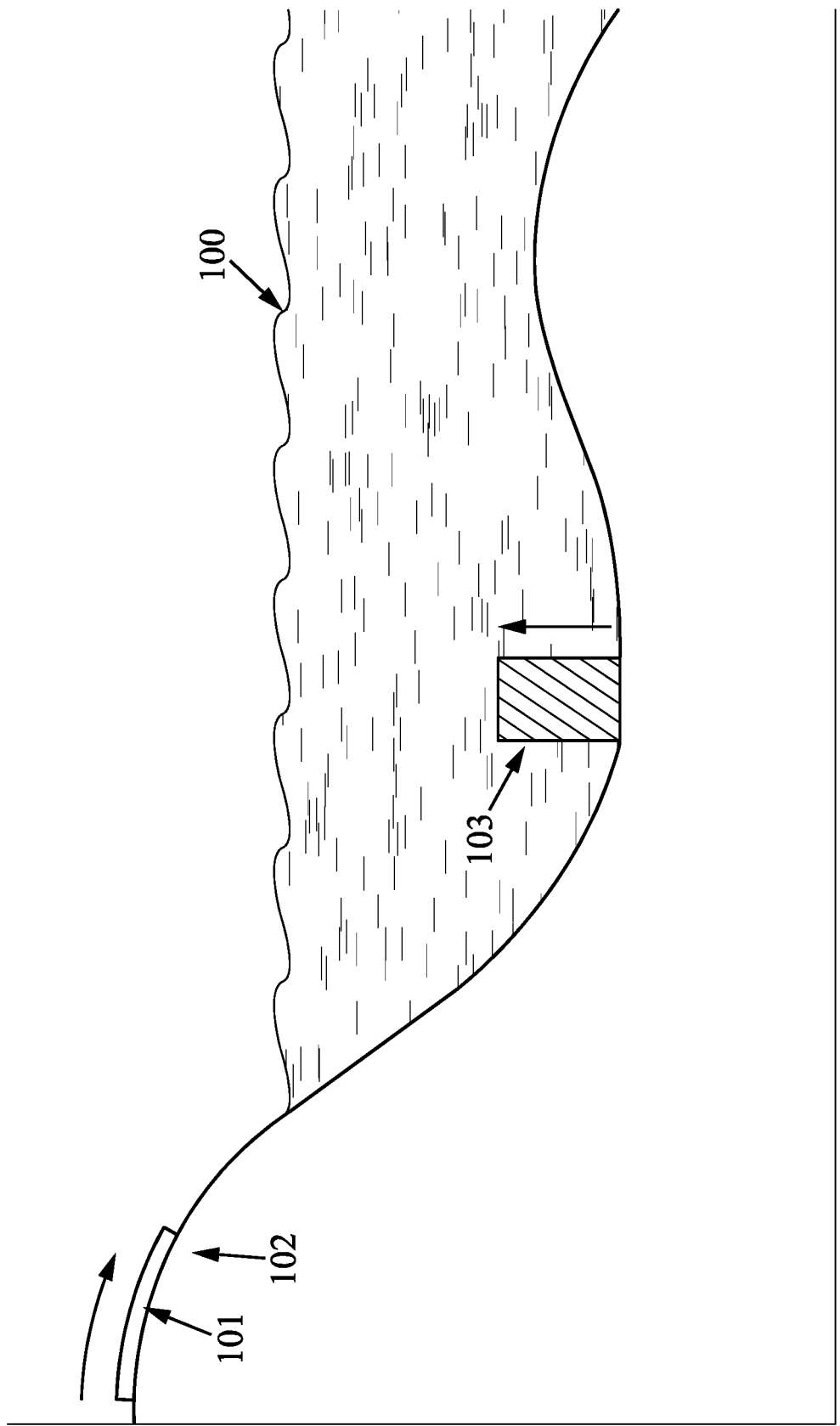
FIG. 1 is an example of a representation of travertine formation.

The manner in which particles of calcium carbonate are deposited depends on the location of the source relative to water level. FIG. 1 is a representation of travertine formation in the case of a sub-water source on the one hand, and an aerial source on the other.

As depicted in FIG. 1, when the source is located above the surface of water 100, i.e. in the case of an aerial source, travertine is dispersed on the soil along the ground relief. This results in a travertine deposit 101 along the contour of the ground 102.

On the other hand, when the source is located below the surface of water 100, i.e. in the case of a sub-water source (or "underwater source"), the travertine is formed vertically, from seabed to water surface. This results in a travertine deposit 103 in the form of vertical chimney.

The present disclosure exploits these two types of deposit to determine the travertine formation in a given area. More specifically, the present disclosure relates on an approach of the "lattice gas automaton" type, wherein the particles may typically correspond to calcium carbonate particles located at different possible sources. The lattice (i.e. the grid of cells) corresponds to a gridded representation of a layer, at a given time, of the geological model.

A determination of the travertine deposit for the current layer is performed at successive times. In the latter, said times are referred to as "time steps" and a determined layer may also be referred to as "time layer". The complete geological model may thus be obtained by superposing the different time layers, i.e. the results obtained at successive time steps.

Figure 2:
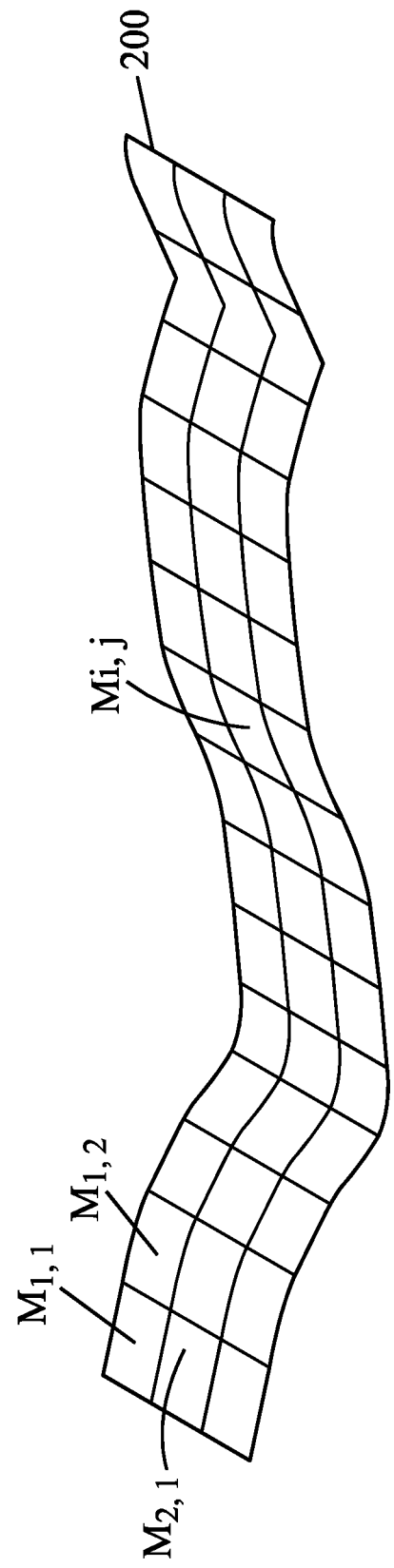
FIG. 2 is an example of a representation of a geological layer gridded model.

FIG. 2 is an example of a representation of a geological layer gridded model. Such model 200 can be used to determine travertine formation over time. The phenomena of carbonate precipitation may occur naturally in a geological environment and such a model makes it possible to determine them.

Modeling an area conducive to the formation of travertine with a geological model, for example a gridded model 200, can be advantageous in the context of the travertine determination according to the embodiments of the disclosure. Indeed, the gridded structure of a geological model simplifies processes using computers and software which natively handle these grid structures.

In the gridded model 200, the movement of particles is simulated in a network (or geological model). An example of the stochastic movement simulation model for particles is described in patent application PCT/FR2011/052099.

As mentioned above, in the context of the present application, the particles may represent calcium carbonate particles. Each passage of particles on a mesh (also called "cell") of the grid is accompanied by a precipitation of travertines, as specified below.

The gridded model 200 can be two-dimensional, for example as illustrated in FIG. 2 for the sake of clarity, or, preferably, three-dimensional.

The layer gridded model 200 of FIG. 2 comprises grid cells $M_{1,1}$, $M_{1,2}$, $M_{2,1}$, ..., and more generally $M_{i,j}$, where the variables i and j indicate the spatial positions of the cells. The probability of the stochastic movement of a particle on the grid may be calculated based on displacement rules defined from the possible motions of the particles presented before, with reference to FIG. 1.

According to an embodiment of the disclosure, the particles may be introduced at a given cell (for example $M_{1,1}$), or at several cells (for example $M_{1,1}$ and $M_{1,2}$), said cell or cells corresponding to active sources.

The locations of the "active sources" of a given layer may be defined by taking into account:
  The locations of the active sources of the previous layer, that is to say the layer corresponding to the previous time; and/or
  The lifetimes of the sources; and/or
  The position of the source with respect to the water level.

In particular, the location $(x_t, y_t)$ of an active source at a layer t, t being a time index and $x_t$ and $y_t$ being spatial coordinates of the source on the grid, may be modeled by a stochastic process, for example, a Markov chain.

Figure 3:
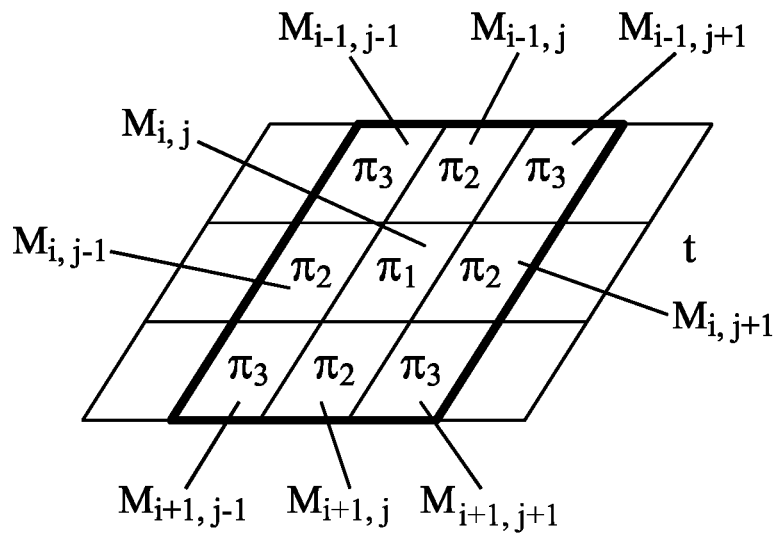
FIG. 3 represents possible locations of an active source in two successive layers of a geological model.
Figure 3:
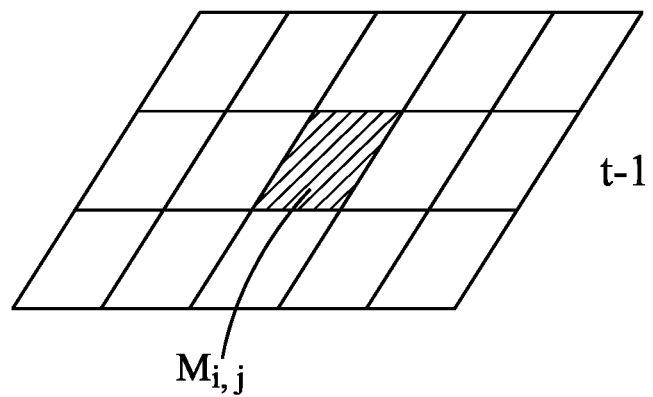

In an illustrative and non-limiting way, a specific example is given in FIG. 3, which represents possible locations of an active source at two successive time steps. In this example, the source at time (t−1) is located at the cell $M_{i,j}$. At time t, the source may be located at same cell $M_{i,j}$ with a probability $\pi_1$, or at one of the 3×3 neighboring cells $M_{i-1,j-1}$, $M_{i-1,j}$, $M_{i-1,j+1}$, $M_{i,j-1}$, $M_{i,j+1}$, $M_{i+1,j-1}$, $M_{i+1,j}$ and $M_{i+1,j+1}$ with different predetermined probabilities, which are given below:

$$P(S_t = M_{i,j-1} | S_{t-1} = M_{i,j}) = P(S_t = M_{i-1,j} | S_{t-1} = M_{i,j}) =$$
$$P(S_t = M_{i,j+1} | S_{t-1} = M_{i,j}) = P(S_t = M_{i+1,j} | S_{t-1} = M_{i,j}) = \pi_2$$

and $$P(S_t = M_{i-1,j-1} | S_{t-1} = M_{i,j}) = P(S_t = M_{i-1,j+1} | S_{t-1} = M_{i,j}) =$$
$$P(S_t = M_{i+1,j-1} | S_{t-1} = M_{i,j}) = P(S_t = M_{i+1,j+1} | S_{t-1} = M_{i,j}) = \pi_3$$

where:
  $P(S_t=M|S_{t-1}=M')$ is the probability that the source at time t is located at the cell M given that the source at time (t−1) is located at the cell M';
  $0 \leq \pi_i \leq 1$ for i=1 ... 3, with $\pi_1 + 4\pi_2 + 4\pi_3 = 1$.

In the example above, the probabilities are equal for the cells located at "a same distance" of $M_{i,j}$ relative to the grid (for instance, cells $M_{i,j-1}$, $M_{i-1,j}$, $M_{i,j+1}$, $M_{i+1,j}$, $M_{i+1,j+1}$). It is noted that the mentioned "distance" could be any mathematical distance such as Euclidian distance, Manhattan distance, etc. Of course, it is possible to define different probabilities for these cells, in particular by favoring some directions (for example, increasing probabilities along lines with larger slopes).

The lifetime of an active source may be predefined, for instance according to a plurality of parameters (for example, geographical coordinates, soil composition, elevation with respect to the water level ... ).

According to a particular embodiment, the lifetime of a source may be modeled by a continuous random variable. For instance, the lifetime of a source can follow an exponential distribution, where the parameter of the distribution may depend on one or more parameters (for example, geographical coordinates, soil composition, elevation with respect to the water level ... ).

Alternatively or additionally, the lifetime may be updated at each time step (i.e. for each layer), by decreasing a current value of the lifetime. The source can then be considered as "not active anymore" when, at a particular time step $t_s$, the value of the lifetime is zero or when it is below a predetermined threshold (e.g. set by an operator).

Furthermore, according to an embodiment of the disclosure, a source located below the water level which is active at a given time step t may be considered as "not active anymore" if it is located above the water level at the next time step t+1. Similarly, a source located above the water level which is active at a given time step t may be considered as "not active anymore" if it is located below the water level at the next time step t+1.

When the source is "not active anymore", no more particles are introduced at the corresponding cells for the time step $t_s$ and all time steps after $t_s$.

Additionally, at each time step, new active sources may be created. For instance, this can be performed by defining some spatial areas over the grid, each area being associated with a probability of presence (or of creation) of an active source. According to a specific embodiment, an area is selected if its probability of presence of a source is above a predetermined threshold, and the location of a new source is determined by a random draw in this area.

The step of creation of new sources may be performed at each time step (for instance, by receiving a plurality of areas with associated probabilities at each time step), or at predetermined times (for instance, every ten time steps), or at times defined by one or several criteria (for instance, in case of significant change of the slope or of the soil composition).

For each layer, that is to say at each time step, and for each cell, the particles may be introduced in waves (i.e. in groups of particles), at successive instants referred to as "emission instants", to be distinguished from the "time steps". Between two successive time steps (i.e. during a determination of a layer of the geological model), there can be one or several emission instant(s) at which the particles are introduced in groups over the grid. For instance, for one given layer corresponding to one given time step, the introduction of particle groups can be performed at predetermined periodic intervals, said intervals defining said "emission instants".

At the end of each emission instant (or, in other words, at the end of each temporal interval defined by two consecutive time instants), the topography is updated in each cell according to the quantity of travertines deposited The number of particles introduced (or "released") at an active source (also simply called "source") may be determined based on one or more parameters, for instance:

A target height of travertine deposit, which can be estimated from the land masses and from the submerged sources. This target height may correspond to the average travertine deposit on the study domain, or to the average thickness on the area where the source is located, which is typically linked to the sedimentation rate of the source; and/or The maximum quantity of travertine deposit allowed per cell of the grid. This maximum deposit may be defined cell by cell, or by groups of cells, or on the entire study domain (that is, the maximum deposit is the same for all the cells of the grid).

For instance, it may be fixed that, for each time step:

The average travertine deposit on the entire study domain is equal to 1 meter, so that particles are introduced until reaching 1 meter of travertine deposit; and The maximum quantity of travertine deposit allowed per cell is equal to 3 meters.

Fixing a maximum quantity of travertine deposit allowed per cell avoids aberrant situations (or "outliers").

Furthermore, the determination of the travertine deposit at a given time step (i.e. for a given time layer) may be stopped when the target height of travertine deposit is reached, and/or when the deposit exceeds the maximum allowed in at least one cell of the grid.

It is assumed that the particles are subjected to, at least, two types of displacement: an "advective displacement" and a "dispersive displacement".

For a given mesh, the advective displacement is likely to take place along a line and in a direction given by a hydraulic gradient corresponding to the region modeled. In particular, in the case of a thermal source located above the water level, the advective displacement is likely to take place along the slope line and in the direction of the gravity vector. For grids corresponding to a region of hydrothermal lifts, for instance in the case of a thermal source located under the water level, the advective displacement may have a component contrary to the force of gravity.

The dispersive displacement takes place along a plurality of lines, and especially along the lines of larger slopes.

Figure 4A:
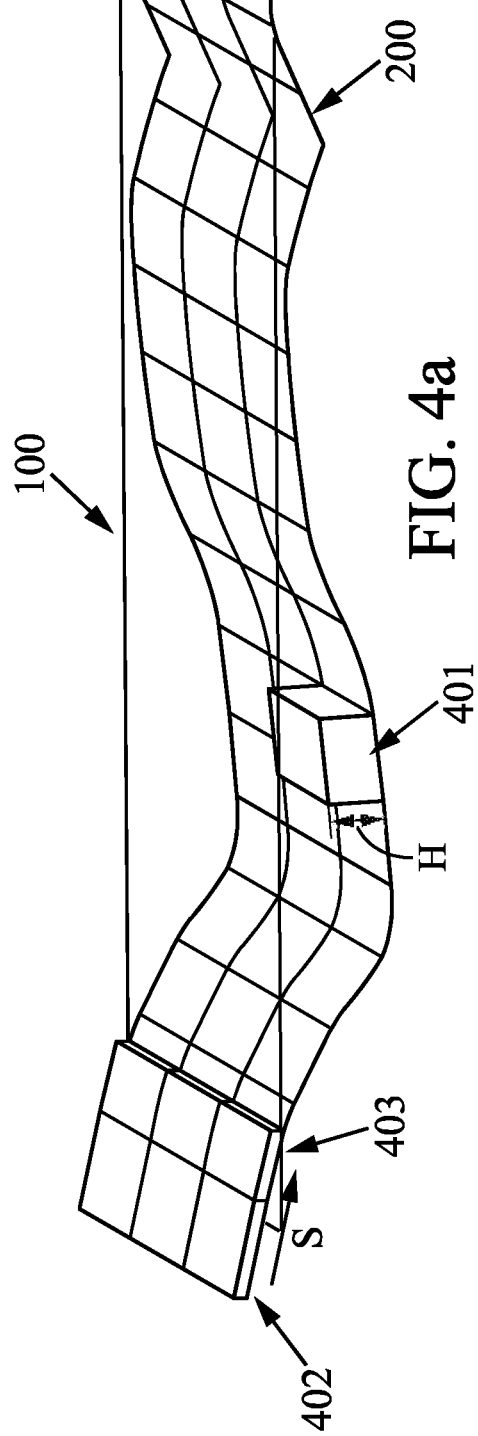
FIGS. 4a and 4b illustrate a cell fill of a gridded geological model according to a possible embodiment of the disclosure.
Figure 4B:
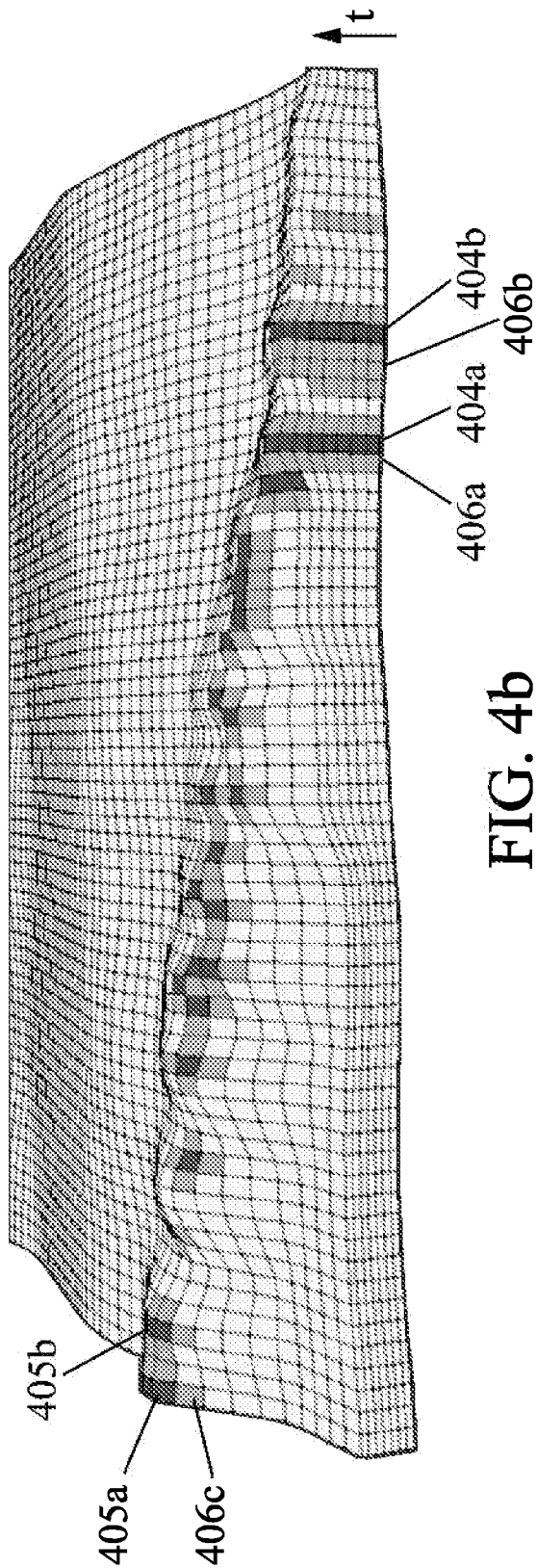

FIGS. 4a and 4b illustrate a cell fill of a gridded geological model according to a possible embodiment of the disclosure.

As represented in FIG. 4a, in case of a source located below the water level 100 (underwater source), a particle released at this source is subjected to advective displacement only, in the form of a vertical movement. By "vertical", it is meant that the particle moves in the opposite direction of gravity. A particle located in a cell 401 at a given time step (t−1) will therefore move in the same cell 401 at next time step t, with a given probability $P_1$. In one embodiment the probability $P_1$ is equal to 1. Alternatively, the probability $P_1$ is strictly lower than 1 (e.g. $P_1$=0.95). In that case, it may be decided that the particle may move from a given cell at time step (t−1) to a cell located in a neighborhood of the given cell at time step t.

When a particle of an underwater source enters a cell 401, there is a travertine precipitation. The amount of precipitated travertine may be determined based on a predetermined distribution function or a predetermined probability density function of travertine precipitation rate. Alternatively, the determination of the amount of precipitated travertine is deterministic. For instance, it may be decided that every particles are associated to a same predefined travertine precipitation rate.

In other words, in case of an underwater source, the travertine deposit 401 is obtained by vertical sedimentation at the source, as depicted in FIG. 4a.

This process is repeated at each time step as long as the source remains submerged, that is to say, as long as the current cell remains below the water level 100. If, at time step t, the cell 401 is above the water level while it was below the water level at time step (t−1), the stochastic process is stopped. In case of introduction of particles in waves, this stopping criterion can be applied for two consecutive emission instants. Furthermore, a particle is destroyed if it leaves the domain of study.

In case of an underwater source, the total number of particles introduced at the source at time step t may be determined based on the average travertine deposit on the study domain, or on the average thickness on the area where the source is located.

FIG. 4a also represents a source located above the water level 100 (aerial source). A particle released at this type of source is subjected to both advective and dispersive displacements.

In this case, the advective displacement consists in a stochastic movement, wherein the transition probabilities depend on the topography of the area around the source, and more specifically on the slope S between two neighboring cells 402 and 403. During the simulation of the displacement of a particle situated on cell 402 of the grid, a probability of advective displacement is estimated, based on at least one slope S between the cell 402 and one respective neighboring cell 403. A random draw weighted by this estimated probability is then performed, and the advective displacement takes place or not according to the result of the random draw.

As mentioned above, according to an embodiment, the particles are introduced in waves, at different emission instants. In that case, the topography of the area may be updated at the end of a wave in function of the quantity of travertine deposit on the cells. The transition probabilities associated with the advective displacement may thus be updated based on the updated topography, after each wave of particles.

Each particle may also be submitted to a dispersive displacement, which takes place along a number of lines, and especially along the lines of larger slopes. The dispersive displacement also consists in a stochastic movement, wherein the set of probabilities $P_{disp}^{i,j}$ that a particle moves to a cell may be estimated or predetermined. According to an embodiment, a random draw weighted by these probabilities $P_{disp}^{i,j}$ is then performed, and the dispersive displacement takes place along the line and in the direction given by the result of the random draw. Furthermore, the dispersive displacement may be performed under the constraint that the particle cannot go up to the slope. In other word, the dispersive displacement cannot result in a movement of the particle towards a cell located upstream (or with a very low probability).

For instance, a particle may move from cell 402 to cell 403, but not from cell 403 to cell 402. Additionally, the particles may be destroyed if they reach the water level 100, that is, if they enter the water. They also are destroyed if they leave the domain of study.

Whenever a particle moves from one cell 402 of the grid to a neighboring cell 403, there is a travertine precipitation. The amount of precipitated travertine depends on the slope S between the neighboring cells 402 and 403. According to an embodiment of the disclosure, the amount of precipitated travertine at a passage of a particle from the cell 402 to the neighboring cell 403 may be given by the following equation:

$$\Delta P = R_1 + R_2 \times S + R_3 \times S^p$$

where ΔP is the quantity (or amount) of travertine precipitation, expressed as a percentage of the maximal possible precipitation quantity that the particle may create on its path (which depends for instance on the saturation in $HCO_3$). In the above equation, S is the slope between the neighboring cells 402 and 403, and $R_1$, $R_2$ and $R_3$ are coefficients which may be predetermined or calculated/determined (e.g. based on examples). For example, the following set of coefficients may be chosen: $R_1=10^{-5}$, $R_2=0.005$ and $R_3=0.005$. According to the context, another set of coefficients may be fixed by the user. Exponent p is a real value related to gas relaxation, modeling an increased travertine precipitation due for instance to Bernoulli effects and local degassing. Advantageously, the exponent p is chosen such as 0<p<1, e.g. p=½.

In other words, according to the above equation, the quantity of travertine precipitation comprises three terms: a term not affected by the topographic slope, a term proportional to the topographic slope, and a term in nonlinear relationship with the topographic slope.

In case of an aerial source, the total number of particles introduced at the source at time step t may be determined based on a target height of travertine deposit, for instance an average travertine deposit on the study domain or on the area where the source is located, and on a maximum quantity of travertine deposit allowed per cell of the grid. The determination of a current time layer can thus be stopped when this target height is reached or when the maximum quantity of travertine is reached for at least one cell of the grid. The determination of the next time layer (that is, the layer corresponding to the next time step) is then started.

When the particles are introduced in waves, the topography of the area may be updated at the end of a wave in function of the quantity of travertine deposit on the cells. The probabilities associated with the dispersive displacement may thus be updated based on the updated topography, after each wave of particles.

FIG. 4*b* shows an example of a result after few time steps. The cells 404*a*, 404*b*, 405*a*, 405*b* in dark gray represent the travertine deposits. Typically, the vertical deposits 404*a* and 404*b* in the form of chimneys correspond to underwater sources, while the deposits 405*a*, 405*b* along the relief correspond to aerial sources.

In addition to the travertine deposits, it is possible to determinate the formation of other sedimentary rocks, and in particular other calcareous sedimentary rocks.

In the example represented in FIG. 4*b*, the formation of coquina, which consists mainly of incompletely consolidated shells, is also determined. The coquina deposits correspond to the cells 406*a*, 406*b*, 406*c* in less darker gray.

Figure 5:
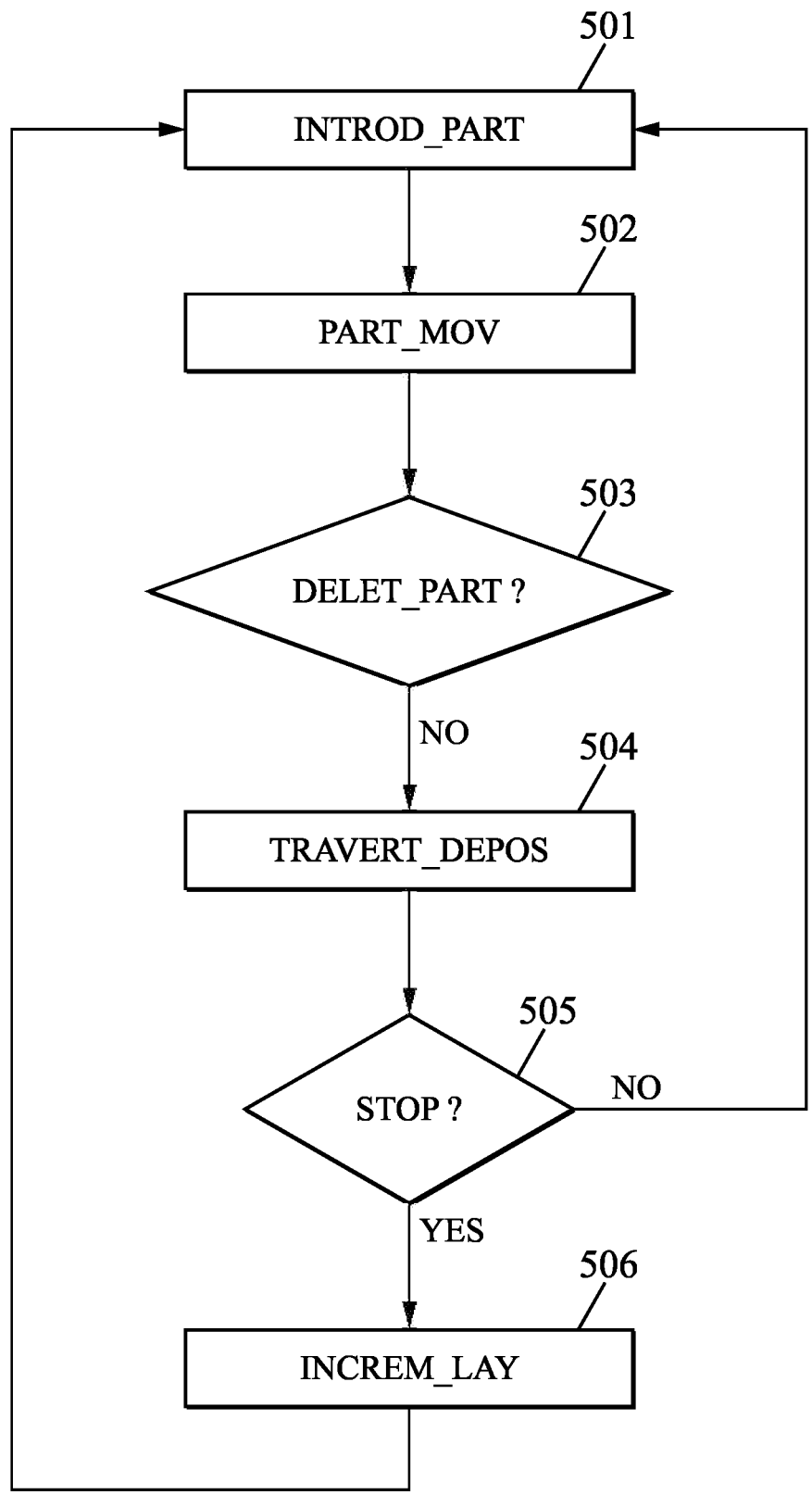
FIG. 5 is a flow chart describing a possible embodiment of the present disclosure.

FIG. 5 is a flow chart describing a possible embodiment of the present disclosure.

At step 501, particles are introduced at one cell, or at several cells, said cell or cells corresponding to active sources.

At step 502, for each introduced particle, a simulation of stochastic displacement is performed based on the location of the source relative to the water level, as explained above.

At step 503, it is decided whether the particle must be kept or not. For instance, a particle is destroyed if it leaves the study domain, or, in the case of an aerial source, if it enters the water.

If the particle is kept, the travertine deposit in the concerned cell is determined according to the schemes presented above.

A stopping criterion is applied in step 505. This criterion may for instance consist in checking whether a target height of travertine deposit is reached, and/or when the deposit exceeds the maximum allowed in at least one cell of the grid, as explained above.

If the stopping criterion is not reached, another wave of particle is introduced (step 501). If the stopping criterion is reached, the determination for the current time layer is stopped, and the determination of travertine deposit begins for the next time layer (step 506) as explained above (e.g. a new determination of sources may occur in the new layer).

Figure 6:
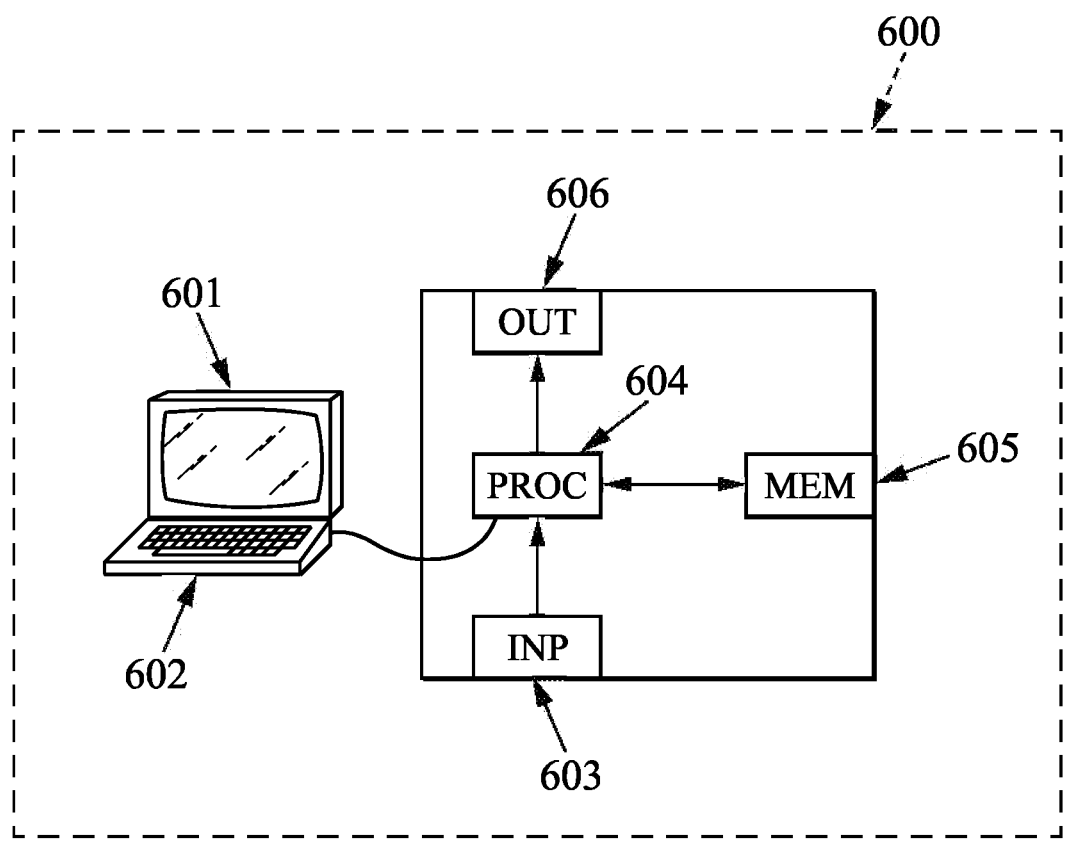
FIG. 6 is a possible embodiment for a device that enables the present disclosure.

FIG. 6 is a possible embodiment for a device that enables the present disclosure.

In this embodiment, the device 600 comprise a computer, this computer comprising a memory 605 to store program instructions loadable into a circuit and adapted to cause circuit 604 to carry out the steps of the present disclosure when the program instructions are run by the circuit 604.

The memory 605 may also store data and useful information for carrying the steps of the present disclosure as described above.

The circuit 604 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the disclosure are described within silicon, or
- a programmable electronic chip such as a FPGA chip (for «Field-Programmable Gate Array»).

This computer comprises an input interface 603 for the reception of several data used for the above method according to the disclosure, for instance the gridded model, some parameters of the topography of the study domain, etc. This computer also comprises an output interface 606 for providing a determination of the travertine deposit on the study domain.

To ease the interaction with the computer, a screen 601 and a keyboard 602 may be provided and connected to the computer circuit 604.

In addition, the functional diagram shown in FIG. 5 is a typical example of a program which has certain instructions that can be carried out by the device 600. In this respect, FIG. 5 can correspond to the flowchart of a general algorithm of a computer program within the meaning of this disclosure.

Of course, the present disclosure is not limited to the example embodiments described above; it extends to other variants. In particular, the disclosure may be used for determining the formation of other sedimentary rocks than travertine.

The invention claimed is:

1. A computer implemented method for determining travertine deposit on an area, the method comprising:
/a/ receiving a geological gridded model of the area, the geological gridded model comprising a plurality of cells;
/b/ receiving a source cell or a group of source cells of the geological gridded model, said source cell or group of source cells corresponding to a source located in the area;
/c/ determining, in the geological gridded model, a trajectory of a particle introduced at the source cell or at the group of source cells, said trajectory being defined by stochastic movements of the particle;
/d/ updating a travertine deposit in cells of the geological gridded model located on the trajectory of the particle; and
/e/ determining a geological profile of the area based on the travertine deposit and determining at least one hydrocarbon reservoir to exploit based on the geological profile of the area
wherein, if the source cell or the group of source cells is above a water level in the model, updating a travertine deposit comprises:
modifying a height of a current cell located on the trajectory according to a quantity of travertine, said quantity being function of a slope between said current cell and a neighboring cell located in a neighborhood of said current cell.

2. A method according to claim 1, wherein the determination of the trajectory is based on whether the source is located above a water level or not.

3. A method according to claim 2, wherein a number of particles introduced at the source cell or at the group of source cells is determined based on a target height of travertine deposit, or a maximum quantity of travertine deposit allowed per cell of the grid.

4. A method according to claim 1, wherein said quantity of travertine comprises a linear term which depends on the slope, and a non-linear term which depends on the slope.

5. A method according to claim 4, wherein said quantity of travertine is equal to:

$$R_1 + R_2 \times S + R_3 \times S^{1/2}$$

where S is the slope between the current cell and the neighboring cell, and $R_1$, $R_2$ and $R_3$ are coefficients.

6. The method according to claim 1, wherein /b/, /c/ and /d/ are iteratively performed until an average travertine deposit is reached for a group of cells and/or when a maximum quantity of travertine deposit allowed per cell of the grid is reached.

7. A method according to claim 1, wherein, if the source cell or at the group of source cells is above a water level in the model and if the trajectory meets the water level, said particle is destroyed.

8. A method according to claim 1, wherein each cell of the geological gridded model has a respective altitude, and wherein, if the source is located above a water level, the stochastic movements of the particle in /c/ include:
a first stochastic displacement associated to a set of first probabilities, said first probabilities depending on a slope between a first cell where the particle is located and a second cell located in a neighborhood of said current cell; and
a second stochastic displacement in which a second probability that the particle moves from a cell A to a cell B, cell B having a higher altitude than cell A, is set to zero or to a value below a predetermined threshold of significance.

9. A method according to claim 1, wherein, if the source is located under a water level, the stochastic movements of the particle in /c/ are vertical movements.

10. A non-transitory computer readable storage medium, having stored thereon a computer program comprising program instructions, the computer program being loadable into a data-processing unit and adapted to cause the data-processing unit to carry out the method of claim 1 when the computer program is run by the data-processing device.

11. A device for determining travertine deposit on an area, the device comprising:
an interface for receiving a geological gridded model of the area, the geological gridded model comprising a plurality of cells;
a circuit for receiving a source cell or a group of source cells of the geological gridded model, said source cell or group of source cells corresponding to a source located in the area;
a circuit for determining, in the geological gridded model, a trajectory of a particle introduced at the source cell or at the group of source cells, said trajectory being defined by stochastic movements of the particle; and
a circuit for updating a travertine deposit in cells of the geological gridded model located on the trajectory of the particle a circuit for determining a geological profile of the area based on the travertine deposit and for determining at least one hydrocarbon reservoir to exploit based on the geological profile of the area,
wherein, if the source cell or the group of source cells is above a water level in the model, updating a travertine deposit comprises:
modifying a height of a current cell located on the trajectory according to a quantity of travertine, said quantity being function of a slope between said current cell and a neighboring cell located in a neighborhood of said current cell.

* * * * *